(12) United States Patent
Kahn et al.

(10) Patent No.: US 8,560,218 B1
(45) Date of Patent: Oct. 15, 2013

(54) METHOD AND APPARATUS TO CORRECT FOR ERRONEOUS GLOBAL POSITIONING SYSTEM DATA

(75) Inventors: Philippe Kahn, Aptos, CA (US); Arthur Kinsolving, Santa Cruz, CA (US); David Vogel, Santa Cruz, CA (US); Mark Andrew Christensen, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 703 days.

(21) Appl. No.: 12/347,993

(22) Filed: Dec. 31, 2008

(51) Int. Cl.
*G01C 21/00* (2006.01)
*G01S 5/14* (2006.01)

(52) U.S. Cl.
USPC .......................................... 701/216; 342/257

(58) Field of Classification Search
USPC ........................................................ 701/216
See application file for complete search history.

(56) References Cited

U.S. PATENT DOCUMENTS

| | | | |
|---|---|---|---|
| 6,417,802 B1 * | 7/2002 | Diesel | 342/357.31 |
| 7,579,984 B2 * | 8/2009 | Wang et al. | 342/357.59 |
| 2005/0040985 A1 * | 2/2005 | Hudson et al. | 342/357.02 |
| 2005/0060069 A1 * | 3/2005 | Breed et al. | 701/29 |
| 2007/0194984 A1 | 8/2007 | Waid | |
| 2010/0120422 A1 * | 5/2010 | Cheung et al. | 455/434 |

OTHER PUBLICATIONS

Warner, Jon S., et al. "GPS Spoofing Countermeasures," http://www.homelandsecurity.org/bulletin/Dual%20Benefit/warner_gp . . . , accessed Oct. 14, 2008, 6 pages.

\* cited by examiner

*Primary Examiner* — Hiep V Nguyen
(74) *Attorney, Agent, or Firm* — Blakely, Sokoloff, Taylor & Zafman LLP; Judith A. Szepesi

(57) ABSTRACT

A method and apparatus for detecting bad signals at a global positioning system (GPS) enabled device are described. In one embodiment, the GPS enabled device includes one or more inertial sensors to provide acceleration measurements for the GPS enabled device, and a GPS receiver to receive positioning data for the GPS enabled device. The GPS enabled device may also include a comparison logic to predict a position of the GPS enabled device from the acceleration measurements, and determine whether the received positioning data is within a confidence interval of the prediction.

19 Claims, 5 Drawing Sheets

METHOD AND APPARATUS TO CORRECT FOR ERRONEOUS GLOBAL POSITIONING SYSTEM DATA

FIELD OF THE INVENTION

The present invention relates to the field of global positioning systems; more particularly, the present invention relates to detection of bad signals at a global positioning system enabled device.

BACKGROUND

There is a risk in utilizing global position system (GPS) signals for detecting location and/or speed of travel. GPS signals can be spoofed using a malicious pseudolite. A pseudolite is pseudo-satellite which simulates a timing signal (carrier, C/A clock, and/or ephemeris). An erroneous pseudolite provides a signal that is delayed or advanced from a real GPS signal.

Another risk in utilizing GPS signals for detecting location and/or speed of travel involves damaged GPS signal transmitters. GPS satellites may malfunction, be damaged in orbit, deteriorate, or otherwise transmit inaccurate information. Examples of timing signals inaccuracies include signal delay due to atmospheric conditions, signal multi-path, orbital errors (e.g., inaccurate ephemeris data regarding a satellite's reported location), etc.

A prior art GPS receiver will compute an incorrect position if it receives data from an erroneous pseudolite or damaged GPS satellite since the GPS receiver will rely on the delayed or advanced GPS timing signal. Similarly a GPS receiver will rely on inaccurate timing signals due to the external conditions noted above. The GPS receiver will think that its position is further or closer to the source it is measuring. Based on the erroneous input, a prior art GPS receiver will compute a position that is moving at a rate that is different from the actual movement. Therefore, based on the erroneous data, a prior art GPS receiver's measurements will indicate that the GPS system is moving at a faster or slower rate, or moving on a different course, than in reality.

The potential inaccuracies can be risky when GPS systems are used for providing routing. It is more dangerous for self-guided vehicles and navigation systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The embodiments discussed herein generally relate to an apparatus, system, and method for detection of bad signals at a global positioning system (GPS) enabled device. Bad signals may be the result of a broken GPS source, or a malicious false source. In one embodiment, inertial sensors provide acceleration measurements for a GPS enabled device. A location of the GPS enabled device is approximated based on a known location and the acceleration measurements. A GPS receiver receives GPS positioning data. In one embodiment, the approximate location is compared with the received positioning data to determine whether the received positioning data is within a confidence interval of the prediction. In one embodiment, where the received positioning data is not within the confidence interval, one or more remedial actions may be triggered.

Figure 1:
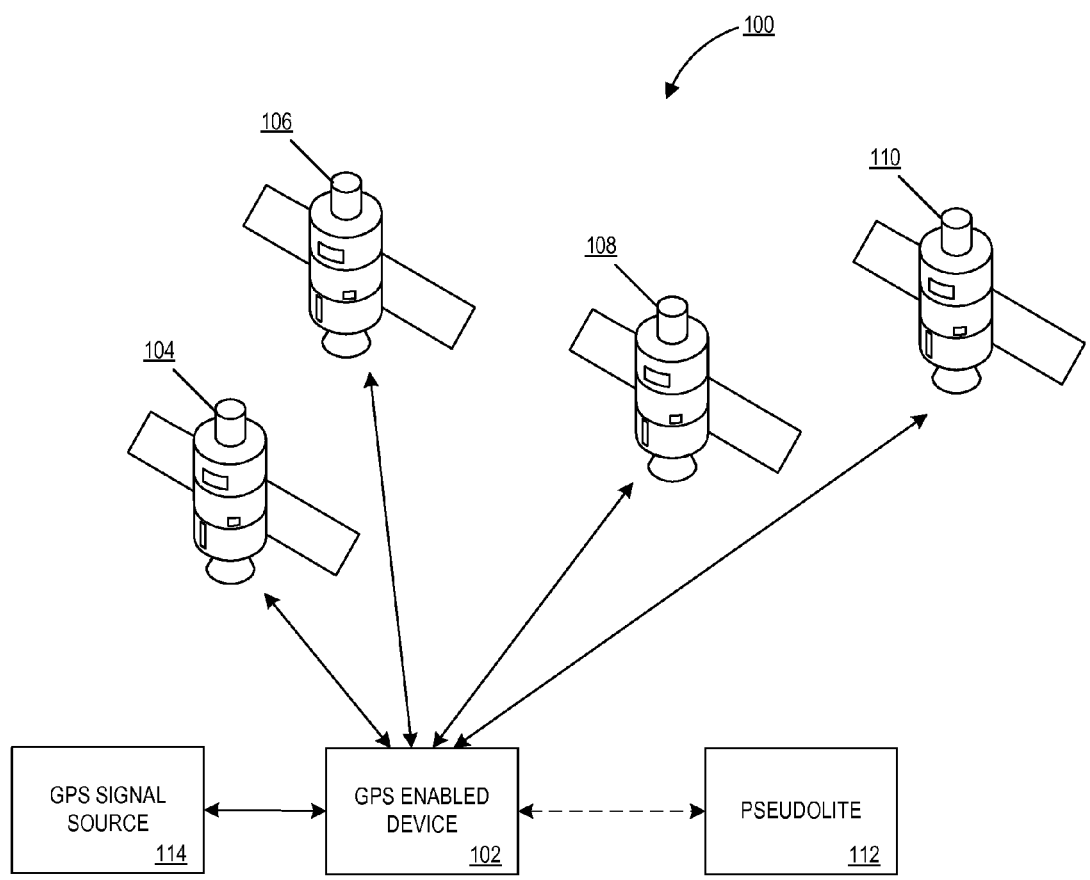
FIG. 1 is a network diagram showing one embodiment of global positioning system.

FIG. 1 is a network diagram showing one embodiment of global positioning system 100. The system 100 includes a global positioning system (GPS) enabled device 102 that receives GPS signals from a plurality of GPS satellites, such as satellites 104, 106, 108, 110, and/or one or more ground based GPS signal sources, such as GPS signal source 114. GPS enabled device 102 utilizes the GPS signals to triangulate its position in a manner well known in the art. The GPS enabled device 102 may be a handheld GPS device (e.g., a GPS enabled cellular phone, PDA, etc.), a GPS enabled navigation device (e.g., a TOMTOM™, GARMIN™, MAGELLAN™, or other navigation system), a self-navigating vehicle, or other device which utilizes GPS data for location determination.

In one embodiment, GPS enabled device 102 utilizes three or more signals (from satellites 104, 106, and 108, for example) to determine a longitude and latitude of GPS enabled device's current location. In another embodiment, GPS enabled device 102 utilizes four satellite signals (from satellites 104, 106, 108, and 110 for example) to determine a longitude, latitude, and altitude of GPS enabled device's current location. In one embodiment, GPS enabled device 102 makes successive location calculations to determine additional information, such as, for example, GPS enabled device's speed, bearing, track, trip distance, route, etc. The GPS enabled device 102 may use a mapping function in conjunction with the location data from the GPS signals.

As will be discussed in greater detail below, in one embodiment, GPS enabled device 102 includes one or more inertial sensors, such as accelerometers and gyroscopes (not shown). The inertial sensors allow GPS enabled device 102 to predict a location. The location determination based on the actual satellite signals, may then be compared against the prediction. When the calculated location is not within a confidence interval of the prediction, GPS enabled device 102 knows that it is receiving an erroneous signal. In one embodiment, the prediction and comparison therefore ensures that GPS enabled device 102 does not rely on erroneous GPS signal data.

The GPS signal between GPS satellite 110 and GPS enabled device 102 is illustrated in dashed line. In one embodiment, the dashed line indicates that GPS enabled device 102 is receiving erroneous GPS signals from GPS satellite 110. The erroneous GPS satellite signals may be due to internal satellite errors, signal multipath, clock errors, orbital errors, a malicious source, etc.

In one embodiment, the dashed line between GPS enabled device 102 and GPS source 112 indicates a signal from pseudolite 112. In one embodiment, pseudolite 112 transmits rogue/erroneous GPS signals to GPS enabled device 102 which appears to be a valid GPS timing signal (e.g., carrier, C/A clock and/or ephemeris) but carries incorrect information. The rogue/erroneous GPS signals may be a malicious source configured to cause a general disruption to data in GPS system 100. The rogue/erroneous GPS signals may also be configured to intentionally lead a GPS enabled device 102 off course. Such intentional disruptions and misleading can result in serious consequences for self-navigating transportation systems, or users following GPS directions.

As discussed in greater detail below, GPS enabled device 102 utilizes inertial sensors and a predicted location to identify when an erroneous or rogue GPS signal is received. In one embodiment, GPS enabled device 102 performs one or more remedial actions in response to detecting an erroneous GPS signal.

Figure 2:
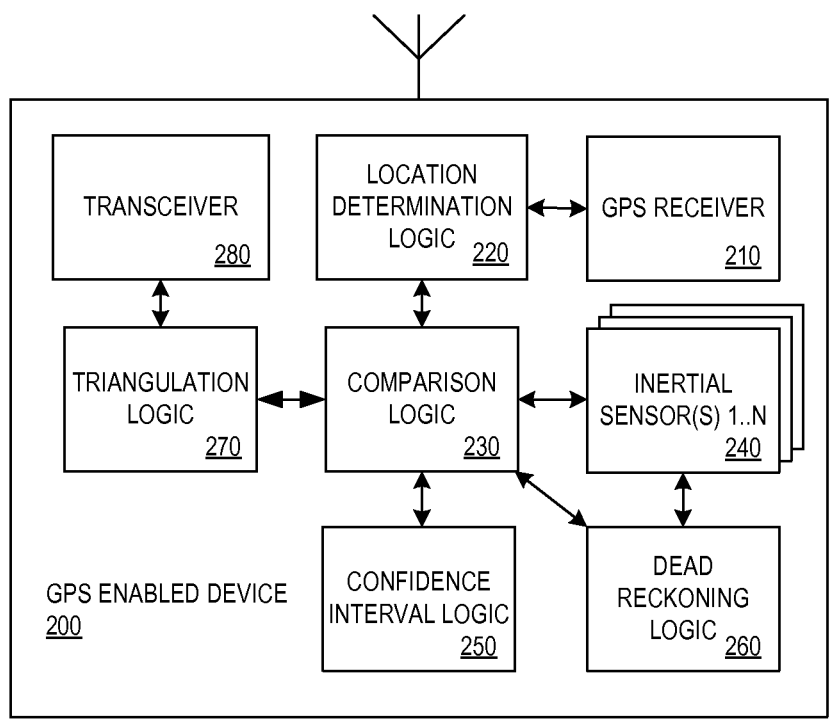
FIG. 2 is a block diagram of one embodiment of a global positioning system device.

FIG. 2 is a block diagram of one embodiment of a GPS enabled device 200. GPS enabled device 200 includes a GPS receiver 210 for receiving GPS signals. As discussed above, GPS signals may be received from a plurality of GPS satellites, ground-based GPS signal sources, as well as pseudolites. Location determination logic 220 utilizes the received GPS signals to calculate one or more elements of positioning data, such as latitude, longitude, altitude, etc. of GPS enabled device 200. In one embodiment, GPS enabled device 200 includes a memory (not shown) for storing positioning data calculated by location determination logic 220. Location determination logic 220 may then utilize successive positioning data to further calculate course, bearing, velocity, etc.

In one embodiment, comparison logic 230 receives the one or more elements of positioning data P for a first time period k−1, referred to as $P_{k-1}$ and a next time k, referred to as $P_k$. Comparison logic 230 also receives data from one or more inertial sensors (such as inertial sensor 1 through inertial sensor N) 240 for time period k−1. In one embodiment, inertial sensors 240 include one or more: accelerometer, gyroscope, or a combination of both.

In one embodiment, comparison logic 230 utilizes the location data for time period k−1 and inertial data between times k−1 and time k to calculate predicted positioning data at time period k, referred to as $P'_k$. In one embodiment, confidence interval logic 250 calculates a confidence interval for the predicted position data $P'_k$. The confidence interval is a margin of error of the prediction. In one embodiment, the confidence interval incorporates factors bearing on the prediction, such as quality of inertial sensors 240, number and length of acceleration(s) during a time period, length of time period, etc. For example, steady acceleration over a time period will yield a more accurate prediction of location (e.g. a prediction with a smaller confidence interval) compared to a time period with irregular accelerations.

In one embodiment, comparison logic 230 may then compare $P_k$ and $P'_k$ to determine if $P_k$ is within the confidence interval of $P'_k$. When the positioning data $P_k$ is within the confidence interval of the predicted positioning data $P'_k$, GPS enabled device 200 is receiving true/proper GPS signals (e.g., not from a malicious source or malfunctioning source). However, when the positioning data $P_k$ is not within the confidence interval of the predicted positioning data $P'_k$, comparison logic 230 triggers one or more remedial actions.

In one embodiment, comparison logic 230 triggers dead reckoning logic 260. In one embodiment, dead reckoning logic 260 utilizes data from inertial sensors 240 to provide navigation data. Dead reckoning logic 260 provides navigation data to GPS enabled device 200 based on a last known trusted position data and speed, time, and course data derived from inertial sensors 240. In one embodiment, dead reckoning logic 260 continues to supply GPS enabled device 200 with navigation data until comparison logic 230 determines that erroneous GPS signals are no longer being received by GPS enabled device 200. In another embodiment, dead reckoning logic 260 may disengage a navigation system so that navigation system will not incorrectly guide a self-navigating system, as well as provide incorrect navigation details.

In one embodiment, comparison logic 230 triggers triangulation logic 270. Triangulation logic 270 reads the positioning data calculated by location determination logic 220 as well as predicted positioning data calculated by comparison logic 230. In one embodiment, triangulation logic 270 reads the positioning data for several successive time periods. Over the successive time periods, triangulation logic 270 in one embodiment is able to pinpoint the source of the incorrect GPS signal (via differences in predicted versus calculated positioning data), as well as to triangulate a location of the erroneous source. In one embodiment, once triangulation logic 270 determines the erroneous source location, it causes transceiver 280 to generate one or more alerts. In one embodiment, an alert is a message sent to a user, a communication to authorities about the existence of and location of a rogue source, a notification of a manufacturer, or other action.

Figure 3:
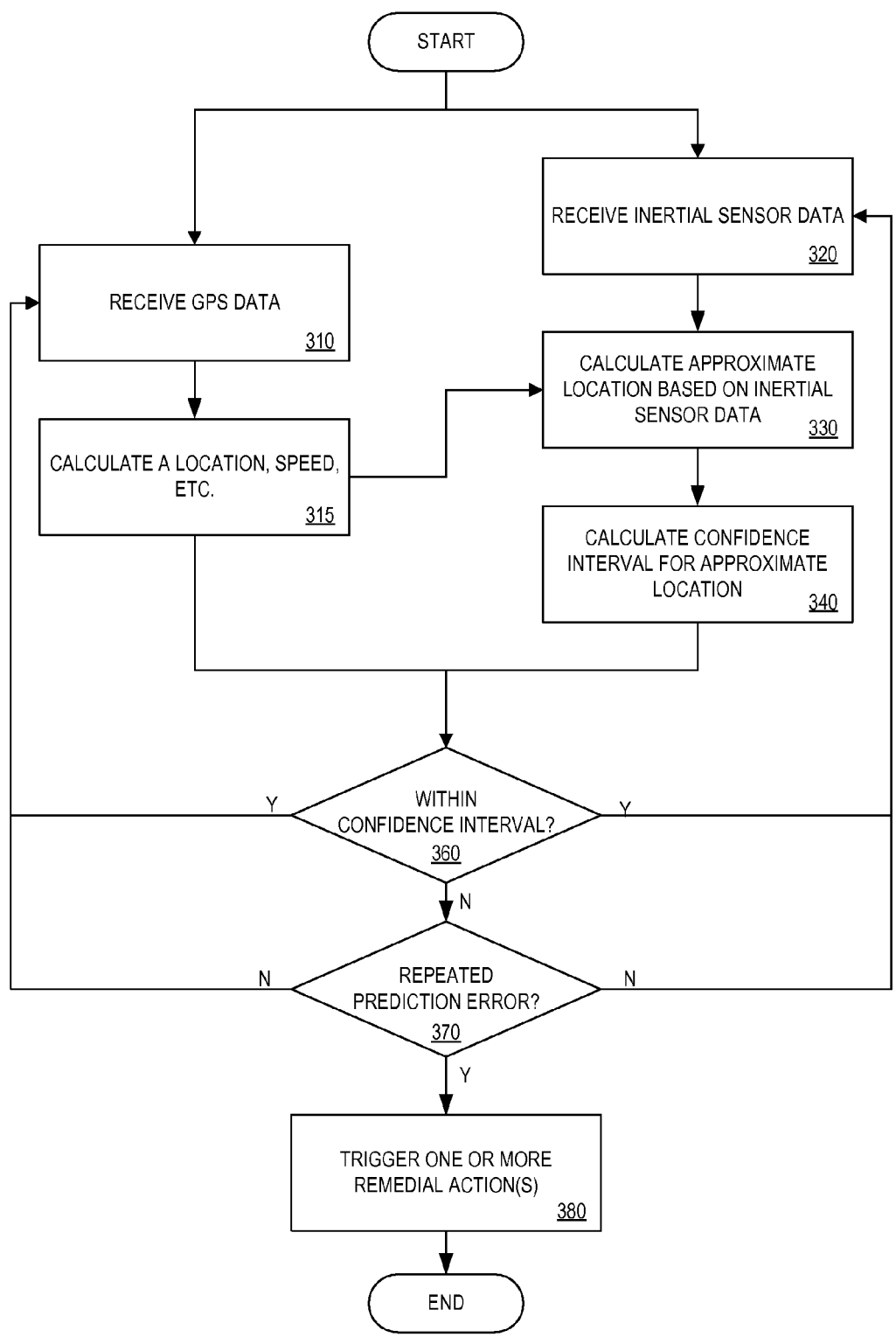
FIG. 3 is a flow diagram of one embodiment of calculating and estimating position using inertial sensor data.

FIG. 3 is a flow diagram of one embodiment of calculating and estimating position using inertial sensor data. The process is performed by processing logic that may comprise hardware (circuitry, dedicated logic, etc.), software (such as is run on a general purpose computer system or a dedicated machine), or a combination of both.

The process starts when processing logic receives GPS data at a time (processing block 310) and calculates a position, speed, etc. (processing block 315). In one embodiment, the calculation of speed utilizes prior GPS readings. In one embodiment, processing logic continuously receives GPS data and calculates position.

Inertial sensor data is also received (processing block 320). In one embodiment, the inertial sensor data is received from one or more accelerometers and/or gyroscopes, and indicates acceleration of the GPS enabled device. In one embodiment, the inertial sensor data is sampled at a set rate. In one embodiment, the rate is 180 times per minute. In another embodiment, the sampling rate is adjusted based on the level of acceleration. When the acceleration is changing rapidly, the sampling rate is adjusted upward, and when there is little acceleration, or steady acceleration, the sampling rate is adjusted down.

Processing logic calculates an approximate location based on the inertial sensor data and location data received from processing block 315 (processing block 330). In one embodiment, processing logic calculates the approximate location via the kinematic equation:

$$P'_k = P_{k-1} + V_0 t + a t^2 \tag{1}$$

Where:
$P'_k$=predicted current position
$P_{k-1}$=a prior position
a=acceleration
$v_0$=velocity
t=time In one embodiment, equation (1) can be simplified by integrating acceleration since the inertial sensors only measure acceleration, over the time period between $P_{k-1}$ and $P_k$, to calculate velocity. As a result:

$$\begin{aligned} P'_k &= P_{k-1} + V_0 t + a t^2 \\ &= P_{k-1} + \left( \int a \right) t + a t^2 \end{aligned} \tag{2}$$

In one embodiment, this calculation may be made using equation (2) multiple times from period k−1 to k, e.g. each time acceleration changes.

In one embodiment, processing logic calculates a confidence interval for the approximate location (processing block 340). In one embodiment, the confidence interval is calculated based on various factors, such as, quality of accelerometers, motions, change in acceleration, number of calculations, sample intervals, etc. In another embodiment, the confidence interval is a set range. Calculated GPS positioning data has inherent uncertainty, and in one embodiment the GPS position calculation has its own confidence interval. For example, a GPS receiver may be able to determine a position within a 15 meter radius due to quality of a GPS receiver, number of satellites connected, how often positioning data is measured and calculated, etc.

In one embodiment, acceleration data is utilized by processing logic to determine one or more of a location, trajectory, speed, course, etc. In one embodiment, the period utilized for the prediction is small, resulting in frequent prediction calculations, in order to reduce cumulative error for a prediction.

GPS data for the next time period is received and positioning data calculated (processing blocks 310 and 315). Processing logic determines if the GPS location data for the next time period is within the confidence interval of the approximate location (processing block 360). In one embodiment, processing logic determines that GPS positioning data is within a confidence interval for predicted location data when the GPS signal confidence interval overlaps a portion of the prediction's confidence interval. Furthermore, in one embodiment, the prediction's confidence interval may adapt to one or more factors of the GPS signal confidence interval. Fox example, if GPS signal strength decreases for two GPS satellite signals, the confidence interval may be expanded or contracted.

When the GPS positioning data matches the predicted location data, processing logic returns to processing blocks 310 and 320 to continue receiving data. Processing logic therefore continues to receive data and calculate locations for successive time periods. In one embodiment, processing logic continuously receives GPS data and inertial sensor data, and calculating positions and confidence intervals. In one embodiment, position and confidence interval calculations are performed in parallel. In one embodiment, separate processes and/or processors calculate the GPS-based location and confidence interval and the acceleration based location and confidence interval. In another embodiment, separate threads on a single processor may be used. Note that while the term "processor" is used, the processor may be a central processing unit (CPU), a microprocessor, a graphics processing unit (GPU/VPU), a physics processing unit (PPU), a digital signal processor (DSP), a coprocessor, or any other type of processing unit.

When the received GPS data does not match the approximate location, processing logic determines whether the failed prediction was a repeated error (processing block 370). That is, when processing logic first detects a discrepancy between GPS location data and the approximated location data, processing logic returns to processing blocks 310 and 320 to receive new GPS data, measure new inertial sensor data, calculate an approximate location and confidence interval, and compare the approximated position data to positioning data calculated from received GPS signals (processing blocks 310-360). The redundant prediction and comparison protects against premature triggering of remedial actions. However, in one embodiment, where security or importance are vital to a particular GPS enabled device, the re-measurement may be omitted. In one embodiment, the error must be observed three, or another number, of times to designate it as a repeated error.

When the failed prediction is a repeated error, processing logic triggers one or more remedial actions (processing block 380), and the process ends. Exemplary remedial actions are described below.

Figure 4A:
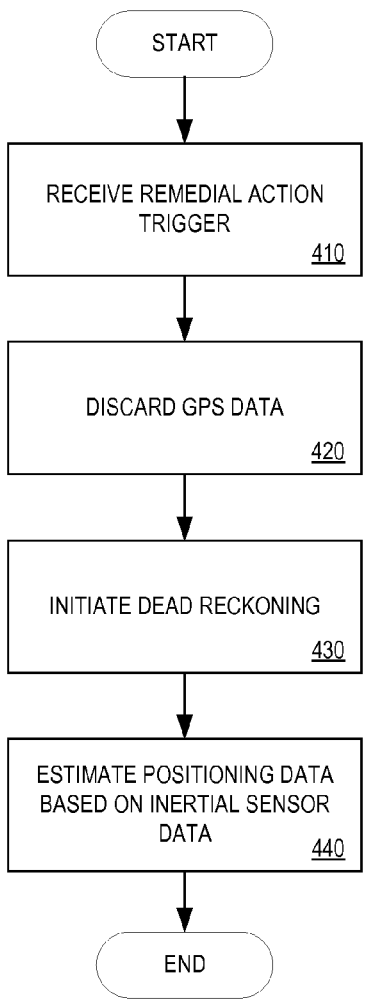
FIG. 4A is a flow diagram of one embodiment of remedial actions at a global positioning system device.

FIG. 4A is a flow diagram of one embodiment of remedial actions at a global positioning system device. The process is performed by processing logic that may comprise hardware (circuitry, dedicated logic, etc.), software (such as is run on a general purpose computer system or a dedicated machine), or a combination of both.

The process starts when a remedial action is triggered (processing block 410). As discussed above, remedial actions are triggered when a confidence interval of predicted positioning data fails to align with a GPS signal confidence interval. In one embodiment, a re-measurement is utilized as a redundant double check against triggering remedial actions due to anomalous signal errors, fleeting conditions, etc.

Processing logic instructs a GPS enabled device to discard GPS data (processing block 420). In one embodiment, because remedial actions are triggered when it is determined that false GPS signals are being received, processing logic disregard the GPS data. By discarding the GPS data processing logic ensures that a pseudolite is not supplying GPS enabled device with erroneous GPS signals. Furthermore, discarded signals from malfunctioning, but legitimate, GPS satellites will not be relied upon for location determination.

In one embodiment, dead reckoning is then initiated by processing logic (processing block 430). Dead reckoning refers to extrapolating positioning data based on a known starting point and motion data (e.g., velocity, acceleration, bearing, etc.). Processing logic estimates positioning data based on inertial sensor data and a last known trusted position (processing block 440). In one embodiment, a last trusted position is utilized by processing logic, as well as inertial sensor data, to calculate positioning data, rather than rely on known false GPS data signals. In one embodiment, processing logic estimates positioning data until the process discussed above in FIG. 3 indicates that proper GPS data is being received.

Figure 4B:
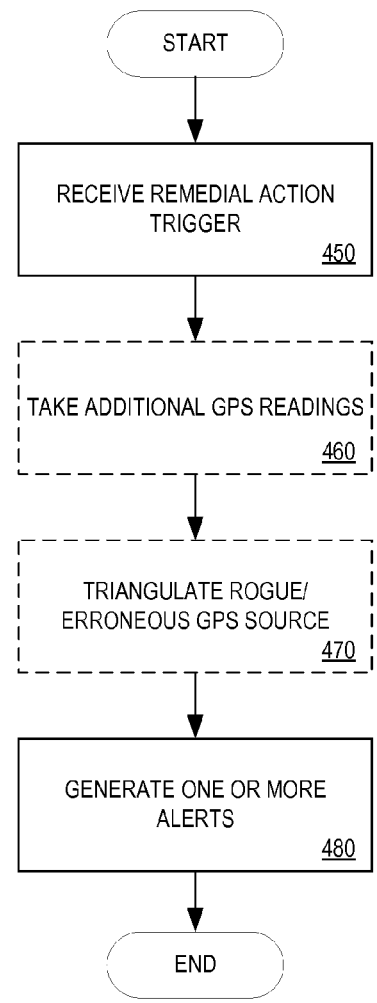
FIG. 4B is a flow diagram of one embodiment of remedial actions at a global positioning system device.

FIG. 4B is a flow diagram of one embodiment of remedial actions at a global positioning system device. The process is performed by processing logic that may comprise hardware (circuitry, dedicated logic, etc.), software (such as is run on a general purpose computer system or a dedicated machine), or a combination of both.

The process starts when a remedial action is triggered (processing block 450). In one embodiment, the remedial action is triggered when a GPS reading outside the confidence interval is detected by a GPS enabled device.

In one embodiment, processing logic takes one or more additional GPS readings (processing block 460) and triangulates a location of an erroneous GPS source based on the additional GPS reading and corresponding inertial sensor readings (processing block 470). In one embodiment, the GPS satellite self-identification is used to locate the erroneous GPS source, and to verify that the erroneous GPS data is being received from the satellite associated with the self-identification.

One or more alerts are then generated (processing block 480). In one embodiment, the alerts may include an alert to a user, a notification that the operating modes of a GPS enabled device has switched to dead reckoning based navigation, an alert to an external party regarding the erroneous GPS data, etc.

Processing blocks 460 and 470 are illustrated in dashed line because they are optional in FIG. 4B. In one embodiment, processing blocks 460 and 470 are performed prior the generation of one or more alerts, so that the erroneous GPS data source and/or location of the erroneous GPS data source may be identified in the one or more alerts. For example, upon a remedial action being triggered, the location of a rogue GPS transmitter may be reported to authorities, or any other interested party.

Figure 5:
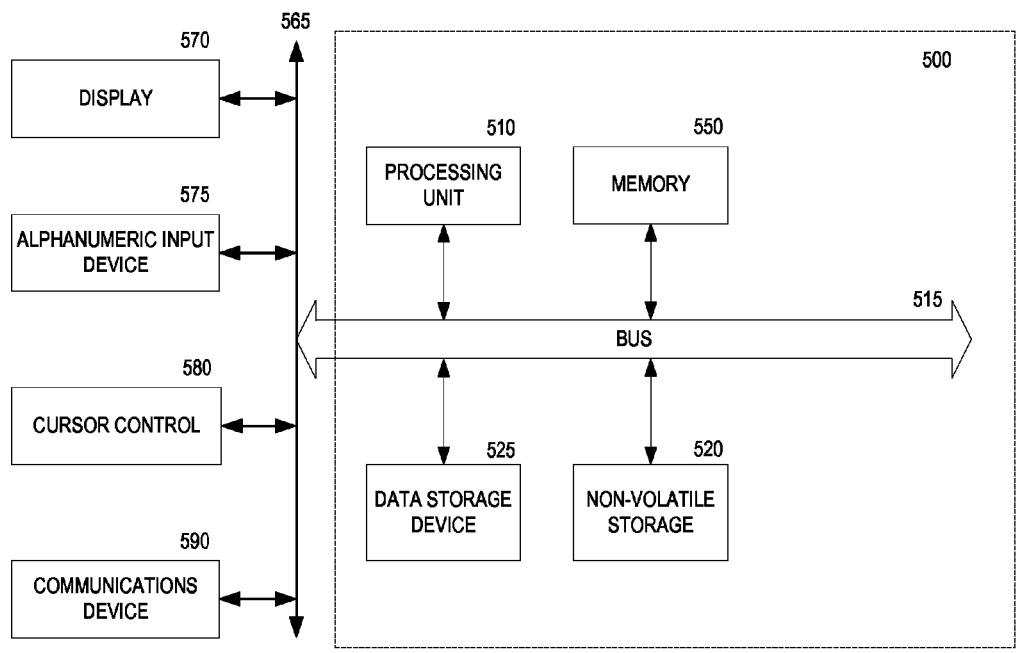
FIG. 5 is a block diagram of one embodiment of a computer system which may be used with the present invention

FIG. 5 is one embodiment of a computer system that may be used with the present invention. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a cathode ray tube (CRT) or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments of the present invention.

It will be appreciated by those of ordinary skill in the art that any configuration of the system may be used for various purposes according to the particular implementation. The control logic or software implementing the present invention can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The present invention may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any computer readable medium locally or remotely accessible to processor 510. A computer readable medium includes any mechanism for storing information in a form readable by a machine (e.g. a computer). For example, a computer readable medium includes read-only memory (ROM), random access memory (RAM), magnetic disk storage media, optical storage media, flash memory devices, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

In the foregoing, specification of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The foregoing specification is, therefore, not to be taken in a limiting sense, and the scope of the present invention is defined only by the appended claims.

What is claimed is:

1. A global positioning system (GPS) enabled device, comprising:
   one or more inertial sensors to provide acceleration measurements for the GPS enabled device from a first time to a second time;
   a confidence interval logic to determine a confidence interval of a predicted position of the GPS enabled device at the second time;
   a GPS receiver to receive GPS positioning data for the GPS enabled device at the first time and the second time;
   a location determination logic to determine a GPS based position of the GPS enabled device at the first time and the second time from the received GPS positioning data corresponding to the first time and the second time; and
   a comparison logic to predict a position of the GPS enabled device at the second time based on the first position and acceleration measurements from the first time to the second time, and determine whether the GPS positioning data received during the second time is erroneous when the GPS based position of the GPS enabled device determined from the GPS positioning data received at the second time is not within the confidence interval of the predicted position of the GPS enabled device during the second time period, wherein the GPS positioning data received at the second time determined to be erroneous is determined to be false GPS data provided from an erroneous GPS data source.

2. The GPS enabled device of claim 1, further comprising:
   the comparison logic to trigger one or more remedial actions at the GPS enabled device in response to the comparison logic determining the GPS positioning data is not within the confidence interval.

3. The GPS enabled device of claim 2, further comprising:
   the comparison logic to discard the GPS positioning data and initiate dead reckoning at the GPS enabled device when the GPS positioning data is determined to include false GPS data provided from the erroneous GPS data source; and
   a dead reckoning logic to estimate positioning data for the GPS enabled device based on the acceleration measurements.

4. The GPS enabled device of claim 2, further comprising:
   the GPS receiver to receive additional positioning data for the GPS enabled device; and
   a triangulation logic to triangulate a location for the erroneous GPS data source that provides the false GPS data based on the additional GPS positioning data and the predicted position.

5. The GPS enabled device of claim 2, further comprising:
   a transceiver to transmit data indicating the location of the erroneous GPS data source.

6. The GPS enabled device of claim 1, wherein the GPS enabled device is a GPS enabled navigation system.

7. The GPS enabled device of claim 1, wherein the one or more inertial sensors are selected from accelerometers and gyroscopes.

8. A method, comprising:
   predicting a position of a global positioning system (GPS) enabled device from one or more inertial sensor readings, wherein the one or more inertial sensors provide acceleration measurements for the GPS enabled device from a first time to a second time, and the position of the GPS enabled device is predicted at the second time based on a first position of the GPS enabled device and acceleration measurements from the first time to the second time;
   determining a confidence interval of the predicted position of the GPS enabled device at the second time;
   receiving GPS positioning data for the GPS enabled device at the first time and the second time;
   determining a GPS based position of the GPS enabled device at the first time and the second time from the received GPS positioning data corresponding to the first time and the second time; and
   determining whether the GPS positioning data received during the second time is erroneous when the GPS based position of the GPS enabled device determined from the GPS positioning data received at the second time is not within the confidence interval of the predicted position of the GPS enabled device during the second time period, wherein the GPS positioning data received at the second time determined to be erroneous is determined to be false GPS data provided from an erroneous GPS data source.

9. The method of claim 8, further comprising:
   initiating one or more remedial actions at the GPS enabled device when the GPS positioning data is not within the confidence interval.

10. The method of claim 9, further comprising:
    discarding the GPS positioning data when the GPS positioning data is determined to include false GPS data provided from the erroneous GPS data source;
    initiating dead reckoning at the GPS enabled device; and
    estimating positioning data for the GPS enabled device based on the one or more inertial sensor readings.

11. The method of claim 8, further comprising:
    receiving additional GPS position data; and
    triangulating a location for the erroneous GPS data source that provides the false GPS data based on the additional GPS positioning data and the predicted position.

12. The method of claim 11, further comprising:
    transmitting data indicating the location of the erroneous GPS data source.

13. The method of claim 8, wherein the GPS enabled device is a GPS enabled navigation system.

14. The method of claim 8, wherein the one or more inertial sensor readings are provided by one or more accelerometers and gyroscopes of the GPS enabled device.

15. A non-transitory computer-readable medium having instructions stored thereon, which when executed by a system, cause the system to perform a method comprising:
    predicting a position of a global positioning system (GPS) enabled device from one or more inertial sensor readings, wherein the one or more inertial sensors provide acceleration measurements for the GPS enabled device from a first time to a second time, and the position of the GPS enabled device is predicted at the second time based on a first position of the GPS enabled device and acceleration measurements from the first time to the second time;
    determining a confidence interval of the predicted position of the GPS enabled device at the second time;
    receiving GPS positioning data for the GPS enabled device at the first time and the second time;
    determining a GPS based position of the GPS enabled device at the first time and the second time from the received GPS positioning data corresponding to the first time and the second time; and
    determining whether the GPS positioning data received during the second time is erroneous when the GPS based position of the GPS enabled device determined from the GPS positioning data received at the second time is not within the confidence interval of the predicted position of the GPS enabled device during the second time period, wherein the GPS positioning data received at the second time determined to be erroneous is determined to be false GPS data provided from an erroneous GPS data source.

16. The computer-readable medium of claim 15, further comprising:
   initiating one or more remedial actions at the GPS enabled device when the GPS positioning data is not within the confidence interval.

17. The computer-readable medium of claim 16, further comprising:
   discarding the GPS positioning data when the GPS positioning data is determined to include false GPS data provided from the erroneous GPS data source;
   initiating dead reckoning at the GPS enabled device; and
   estimating positioning data for the GPS enabled device based on the one or more inertial sensor readings.

18. The computer-readable medium of claim 16, further comprising:
   receiving additional GPS position data; and
   triangulating a location for the erroneous GPS data source that provides the false GPS data based on the additional GPS positioning data and the predicted position.

19. The computer-readable medium of claim 18, further comprising:
   transmitting data indicating the location of the erroneous GPS data source.

\* \* \* \* \*